United States Patent
Tokita et al.

(10) Patent No.: US 11,604,617 B2
(45) Date of Patent: Mar. 14, 2023

(54) PRINTER CONNECTABLE TO A NETWORK AND AN INFORMATION PROCESSING TERMINAL

(71) Applicants: STAR MICRONICS CO., LTD., Shizuoka (JP); KCodes Corporation, Taipei (TW)

(72) Inventors: Daisuke Tokita, Shizuoka (JP); Tangen Chiu, Taipei (TW)

(73) Assignees: STAR MICRONICS CO., LTD., Shizuoka (JP); KCodes Corporation, Neihu District (TW)

( * ) Notice: Subject to any disclaimer, the term of this patent is extended or adjusted under 35 U.S.C. 154(b) by 0 days.

(21) Appl. No.: 17/654,987

(22) Filed: Mar. 15, 2022

(65) Prior Publication Data

US 2022/0206724 A1    Jun. 30, 2022

Related U.S. Application Data

(63) Continuation-in-part of application No. PCT/JP2020/034170, filed on Sep. 9, 2020.

(30) Foreign Application Priority Data

Sep. 20, 2019 (JP) .............................. JP2019-172320

(51) Int. Cl.
*G06F 3/12* (2006.01)

(52) U.S. Cl.
CPC ............ *G06F 3/129* (2013.01); *G06F 3/1203* (2013.01); *G06F 3/1221* (2013.01); *G06F 3/1293* (2013.01)

(58) Field of Classification Search
CPC ...... G06F 3/129; G06F 3/1203; G06F 3/1221; G06F 3/1293

(Continued)

(56) References Cited

U.S. PATENT DOCUMENTS 6,967,738 B1 * 11/2005 Shima .................. G06F 3/1237
                                                                                      358/1.15
8,934,116 B2 * 1/2015 Umekage ............ H04L 12/4641
                                                                                      358/1.15

(Continued)

FOREIGN PATENT DOCUMENTS

JP      2014106581 A    6/2014
JP      2016184299 A    10/2016

(Continued)

OTHER PUBLICATIONS

Mar. 15, 2022, International Preliminary Report on Patentability issued in the International Patent Application No. PCT/JP2020/034170.

(Continued)

*Primary Examiner* — Allen H Nguyen
(74) *Attorney, Agent, or Firm* — Kenja IP Law PC (57) ABSTRACT

The printer (10) of the present disclosure is a printer connectable to a network (30) and an information processing terminal (20), including a control section (15) configured to: when obtaining data in accordance with the network class from the information processing terminal (20), extract a first frame based on a first communication standard used for communications between the printer (10) and the network (30), from the data; when determining that destination information included in the first frame specifies the printer (10), extract and interpret print information included in the first frame; and when determining that the destination information included in the first frame does not specify the printer (10), forward the first frame to the network (30).

20 Claims, 8 Drawing Sheets

(58) Field of Classification Search
USPC .......................................................... 358/1.15
See application file for complete search history.

(56) References Cited

U.S. PATENT DOCUMENTS

| | | | |
|---|---|---|---|
| 9,030,685 B2* | 5/2015 | Shima ................... | G06F 3/1293 358/1.15 |
| 2015/0234620 A1* | 8/2015 | Terashima ............ | G06F 3/1204 358/1.15 |
| 2015/0264208 A1* | 9/2015 | Achiwa .............. | H04N 1/00885 358/1.15 |
| 2017/0013153 A1* | 1/2017 | Shin ...................... | G06F 3/1203 |

FOREIGN PATENT DOCUMENTS

| JP | 2017034482 A | 2/2017 |
|---|---|---|
| JP | 2019062321 A | 4/2019 |

OTHER PUBLICATIONS

Nov. 10, 2020, International Search Report issued in the International Patent Application No. PCT/JP2020/034170.

* cited by examiner

PRINTER CONNECTABLE TO A NETWORK AND AN INFORMATION PROCESSING TERMINAL

CROSS-REFERENCE TO RELATED APPLICATION

This application is a continuation of PCT Application No. PCT/JP2020/034170, filed on Sep. 9, 2020, which claims priority of Japanese Patent Application No. 2019-172320 filed on Sep. 20, 2019 in Japan, the entire disclosure of which is incorporated herein by reference.

TECHNICAL FIELD

The present disclosure relates to a printer connectable to a network and an information processing terminal.

BACKGROUND

Printers that are connectable to an information processing terminal and are also connectable to a network have been conventionally well-known. For example, PTL 1 discloses an information processing apparatus that can handle differences in protocols. Specifically, the information processing apparatus provides a first interface for connecting to a communication line and a processing section for processing data received via the first interface, with data that is received via a second interface for communicating on the basis of a protocol different from the protocol of the first interface.

CITATION LIST

Patent Literature

PTL 1: JP 2016-184299 A

SUMMARY

Technical Problem

Conventional printers such as that described in PTL 1 are designed to receive data on the basis of different communication standards from two different communication lines, and to process the data completely within the printers. Some users, however, may wish to access a network via a printer using an information processing terminal while the information processing terminal is connected to the printer. Conventional printers cannot meet such a demand, and users' convenience is not satisfactorily.

The present disclosure is conceived of in view of such a problem, and an object thereof is to provide a printer which has improved users' convenience.

Solution to Problem

In order to solve the above problem, a printer according to a first aspect is a printer connectable to a network and an information processing terminal, the printer including a control section configured to:

when obtaining data in accordance with a network class from the information processing terminal, extract a first frame based on a first communication standard used for communications between the printer and the network, from the data;

when determining that destination information included in the first frame specifies the printer, extract and interpret print information included in the first frame; and when determining that the destination information included in the first frame does not specify the printer, forward the first frame to the network.

In the printer according to a second aspect, the control section may extract the first frame from a second frame based on a second communication standard used for communications between the printer and the information processing terminal.

In the printer according to a third aspect, when obtaining data in accordance with a second communication protocol on the basis of the second frame from the information processing terminal on the basis of the second communication standard used for communications between the printer and the information processing terminal, the control section may extract and interpret print information contained in the data.

In the printer according to a fourth aspect, when obtaining a request signal from the information processing terminal when the printer and the information processing terminal are connected, the control section may output, to the information processing terminal, hierarchical data indicating that communications can be made in accordance with the network class and the second communication protocol.

The printer according to a fifth aspect may include a power supply section for supplying electric power to the information processing terminal, wherein, when the printer and the information processing terminal are connected, the control section may supply the electric power to the information processing terminal by the power supply section.

In the printer according to a sixth aspect, when a communication in accordance with a first communication protocol on the basis of the first frame is initiated, the control section may reduce the electric power supplied to the information processing terminal by the power supply section.

In the printer according to a seventh aspect, when the communication in accordance with the first communication protocol is terminated, the control section may restore the electric power supplied to the information processing terminal by the power supply section back to a previous power level.

In the printer according to an eighth aspect, when the control section determines that the destination information does not specify the printer and the communication in accordance with the first communication protocol is initiated, the control section may reduce the electric power.

Advantageous Effect

The printer according to one embodiment of the present disclosure improves users' convenience.

DETAILED DESCRIPTION

An embodiment of the present disclosure will be described below with reference to the accompanying drawings.

Figure 1:
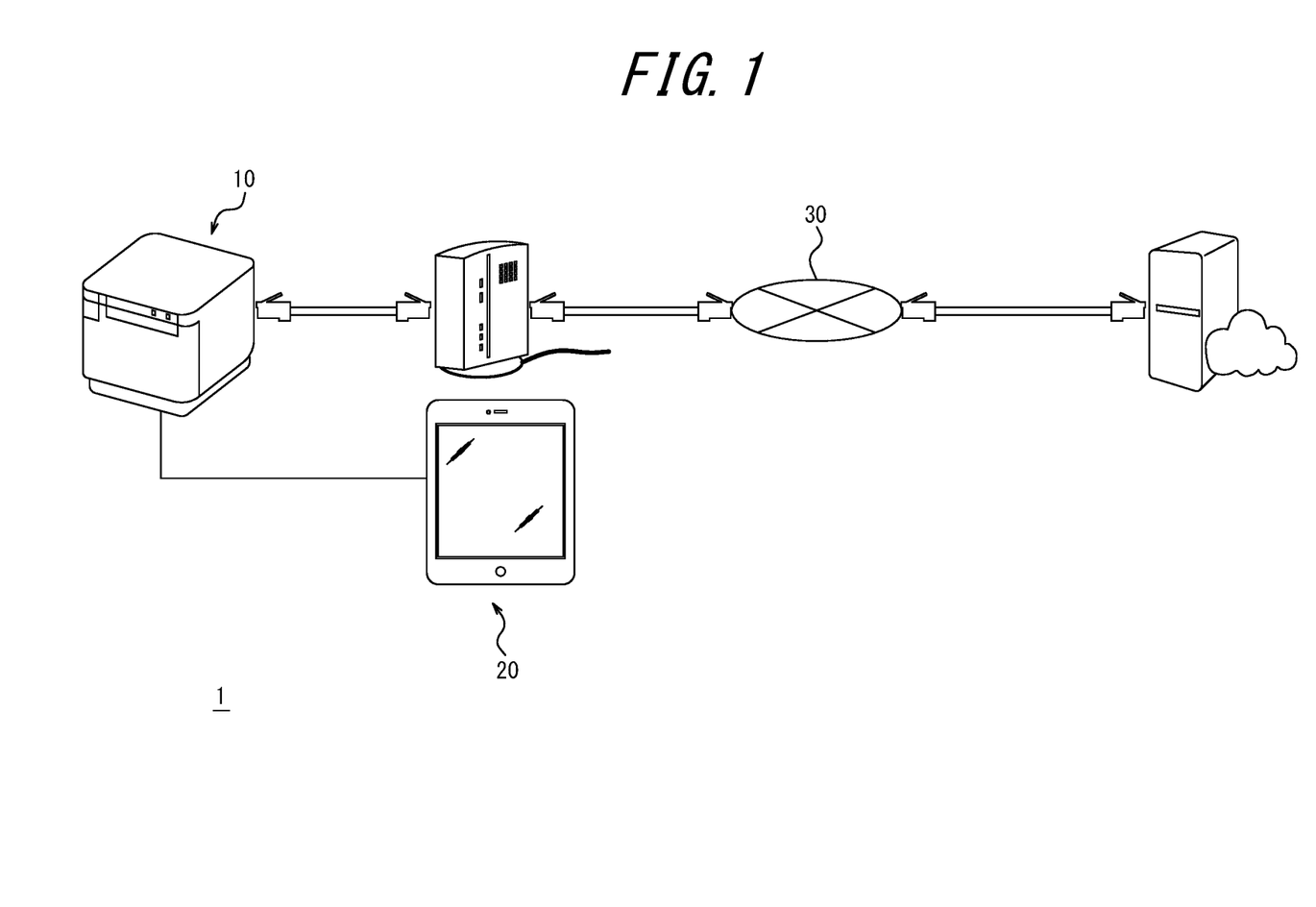
FIG. 1 is a configuration diagram illustrating an example of a system including a printer according to one embodiment of the present disclosure.

FIG. 1 is a configuration diagram illustrating an example of a configuration of a system 1 including a printer 10 according to one embodiment of the present disclosure. Referring to FIG. 1, a description will be given focusing on an overview of a system 1 including the printer 10 according to one embodiment of the present disclosure. The printer 10 includes any printer capable of carrying out printing processing.

For example, the system 1 is connected via the printer 10 to external devices including a router and a switching hub so as to be communicatively connected to a server via a network 30 such as the Internet. The first communication standard used for communications between the printer 10 and the network 30 may include any communication standard, such as the Ethernet communication standard, for example. The first communication protocol used for communications between the printer 10 and the network 30 includes any communication protocol, such as the Transmission Control Protocol/Internet Protocol (TCP/IP), for example.

In addition to the printer 10, the system 1 includes an information processing terminal 20. The information processing terminal 20 is a general-purpose electronic device, such as a smartphone or a personal computer (PC), for example. In the case where the information processing terminal 20 is a smartphone, for example, it may be operated on any operating system (OS) for smartphones. In the case where the information processing terminal 20 is a PC, for example, it may be operated by any OS for PCs. The information processing terminal 20 is not limited to these, and may be an electronic device dedicated to the system 1.

The printer 10 and the information processing terminal 20 are communicatively connected to each other by any cable, such as a Universal Serial Bus (USB) cable. The second communication standard used for communications between the printer 10 and the information processing terminal 20 may include any communication standard, such as the USB communication standard, for example. The second communication protocol used for communications between the printer 10 and the information processing terminal 20 may include any communication protocol, such as a USB-related communication protocol, for example.

In the system 1, when information is sent from the information processing terminal 20 to a server on the network 30, for example, the printer 10 carries out processing to extract a first frame in accordance with the first communication standard from data which has been sent on the basis of the second communication standard and includes the information, and forwards the first frame to the network 30. As a result, the information is sent from the information processing terminal 20 via the printer 10 to the server on the network 30.

In the system 1, when print information is sent from the information processing terminal 20 to the printer 10, for example, the print information is received by the printer 10 and processed within the printer 10. The print information includes a print command and print-related setting information, for example. The print-related setting information includes the print speed and the print density, for example. For example, the printer 10 carries out print processing on the basis of a print command received from the information processing terminal 20. For example, the printer 10 carries out print-related setting processing on the basis of a print-related setting information received from the information processing terminal 20.

Figure 2:
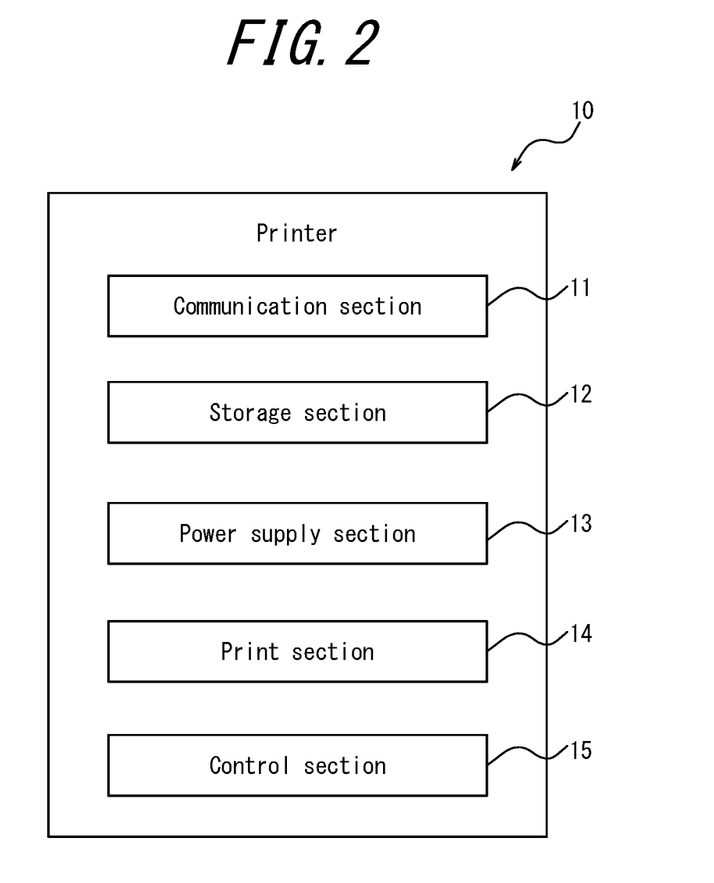
FIG. 2 is a functional block diagram illustrating an example of a schematic configuration of the printer in FIG. 1.

Referring to FIG. 2, a description will be given focusing on the configuration of the printer 10 included in the system 1. FIG. 2 is a functional block diagram illustrating an example of a schematic configuration of the printer 10 in FIG. 1.

As illustrated in FIG. 2, the printer 10 includes a communication section 11, a storage section 12, a power supply section 13, a print section 14, and a control section 15.

The communication section 11 includes a communication interface compliant with the first communication standard. For example, the communication section 11 includes an Ethernet interface. The communication section 11 may include an Ethernet connector and an Ethernet controller. In one embodiment, the printer 10 is communicatively connected to the network 30 via the communication section 11. For example, the printer 10 is communicatively connected to the network 30 through a LAN cable connected to the Ethernet connector. The communication section 11 may provide communications between the printer 10 and the network 30 on the basis of the first communication protocol, such as TCP/IP.

The communication section 11 includes a communication interface compliant with the second communication standard. For example, the communication section 11 includes a USB interface. The communication section 11 may include a USB connector and a USB controller. In one embodiment, the printer 10 is communicatively connected to the information processing terminal 20 via the communication section 11. For example, the printer 10 is communicatively connected to the information processing terminal 20 through a USB cable connected to the USB connector. The communication section 11 may provide communications between the printer 10 and the information processing terminal 20 on the basis of the second communication protocol, such as a USB-related communication protocol, for example. The USB-related communication protocol includes the printer class, for example.

The storage section 12 includes, but is not limited to, a semiconductor memory, a magnetic memory, or an optical memory, for example. The storage section 12 may function as a main memory, an auxiliary memory, or a cache memory, for example. The storage section 12 stores any information used for operations of the printer 10. The storage section 12 may store a system program such as firmware, an application program, and various information received by the communication section 11, for example. The information stored in the storage section 12 may be updatable with information received from the network 30 via the communication section 11, for example.

The power supply section 13 includes any power supply module for supplying electric power to the information processing terminal 20. In the case where the communication section 11 includes a USB connector, for example, the power supply section 13 may include that USB connector which also functions as the communication section 11. The power supply section 13 may supply electric power to the information processing terminal 20 through a USB cable connected to the USB connector.

The print section 14 includes any printing module that carries out printing processing on the basis of a printing command obtained from the information processing terminal 20, for example. The print section 14 carries out printing processing according to the print command on the basis of print-related setting information stored in the storage section 12, for example.

The control section 15 includes one or more processors. In one embodiment, the term "processor" refers to, but is not limited to, a general purpose processor, or a dedicated processor specialized for certain processing. The control section 15 is communicatively connected to each of the components configuring the printer 10 to control operations of the entire printer 10.

Figure 3:
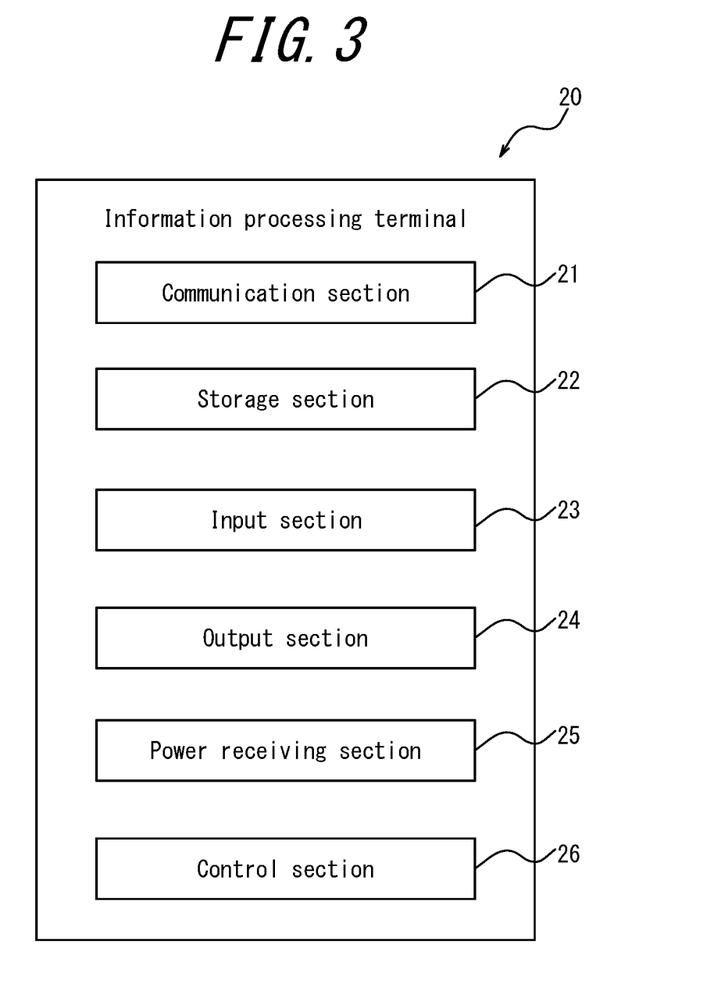
FIG. 3 is a functional block diagram illustrating an example of a schematic configuration of an information processing terminal in FIG. 1.

Referring to FIG. 3, a description will be given focusing on the configuration of the information processing terminal 20 included in the system 1. FIG. 3 is a functional block diagram illustrating an example of a schematic configuration of the information processing terminal 20 in FIG. 1.

As illustrated in FIG. 3, the information processing terminal 20 includes a communication section 21, a storage section 22, an input section 23, an output section 24, a power receiving section 25, and a control section 26.

The communication section 21 includes a communication interface compliant with the second communication standard. For example, the communication section 21 includes a USB interface. The communication section 21 may include a USB connector and a USB controller. In one embodiment, the information processing terminal 20 is communicatively connected to the printer 10 via the communication section 21. For example, the information processing terminal 20 is communicatively connected to the printer 10 through a USB cable connected to the USB connector. The communication section 21 may provide communications between the information processing terminal 20 and the printer 10 on the basis of the second communication protocol, such as a USB-related communication protocol, for example. The USB-related communication protocol includes the printer class, for example.

The storage section 22 includes, but is not limited to, a semiconductor memory, a magnetic memory, or an optical memory, for example. The storage section 22 may function as a main memory, an auxiliary memory, or a cache memory, for example. The storage section 22 stores any information used for operations of the information processing terminal 20. For example, the storage section 22 may store a system program, an application program, and various information received by the communication section 21. The information stored in the storage section 22 may be updateable with information received from the network 30 via the printer 10 and the communication section 21, for example.

The input section 23 includes one or more input interfaces for obtaining input information on the basis of operations made by a user by detecting inputs by the user. For example, the input section 23 may be, but is not limited to, physical keys, capacitive keys, a touch screen integrated with a display as the output section 24, or a microphone for receiving audio inputs.

The output section 24 includes one or more output interfaces for outputting information to notify the user. For example, the output section 24 is, but not limited to, a display for outputting information in the form of graphics, or a speaker for outputting information in the form of sounds. The output section 24 may output a setting screen through which settings can be made so that the information processing terminal 20 is communicatively connected to the network 30 via the printer 10. At this time, the setting screen may display Ethernet settings which have been set by the user using the input section 23, for example.

The power receiving section 25 includes power receiving module for obtaining electric power from the printer 10. In the case where the communication section 21 includes a USB connector, for example, the power receiving section 25 may include that USB connector which also functions as the communication section 21. The power receiving section 25 may obtain electric power from the printer 10 through a USB cable connected to the USB connector.

The control section 26 includes one or more processors. In one embodiment, the term "processor" refers to, but is not limited to, a general purpose processor, or a dedicated processor specialized for certain processing. The control section 26 is communicatively connected to each of the components configuring the information processing terminal 20 to control operations of the entire information processing terminal 20.

Figure 4:
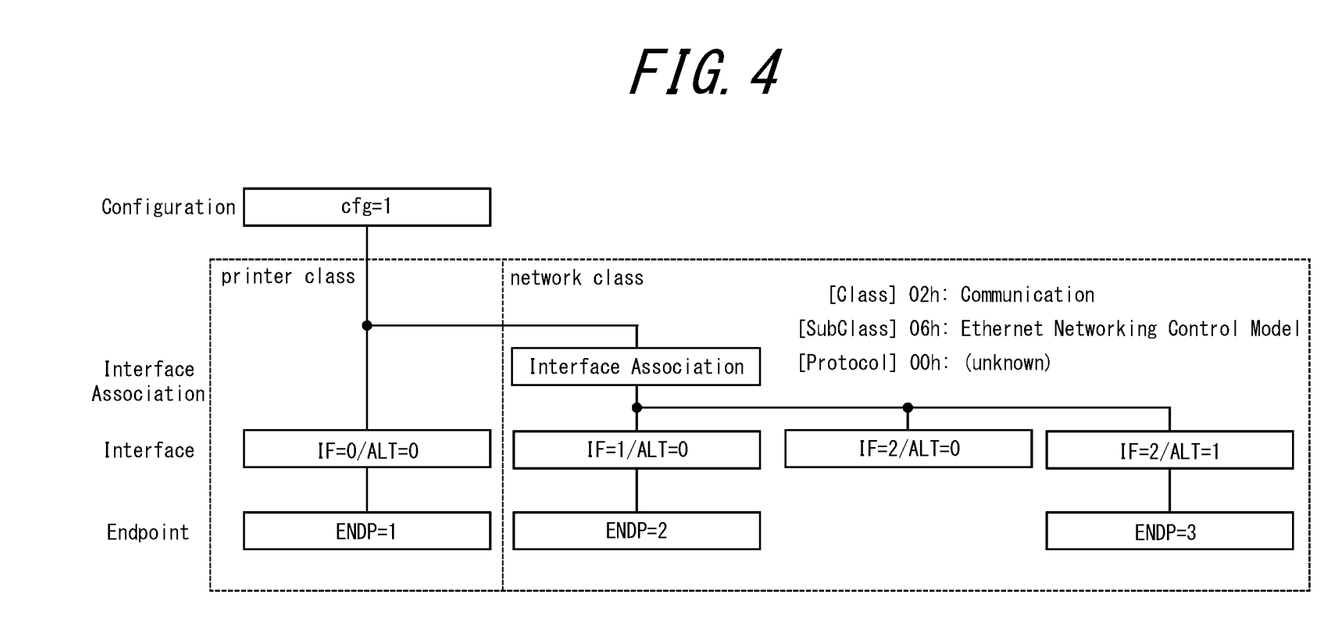
FIG. 4 is a schematic diagram of hierarchical data possessed by the printer in FIG. 1.

FIG. 4 is a schematic diagram illustrating an example of the hierarchical data possessed by the printer 10 in FIG. 1. Referring to FIG. 4, a description will be given focusing on the hierarchical data, e.g., Descriptor, possessed by the printer 10. Further, a description will be given focusing on processing in the system 1 when the information processing terminal 20 is connected to the printer 10.

For example, when the information processing terminal 20 is connected to the USB connector of the printer 10 through a compliant USB cable, the information processing terminal 20 operates as a USB host. At this time, the control section 26 in the information processing terminal 20 sends GET#DESCRIPTOR, which is one of the USB-standard requests, to the printer 10 through the USB cable.

The printer 10 operates as a USB device to the information processing terminal 20 which operates as the USB host. The control section 15 in the printer 10 obtains, from the information processing terminal 20, the request signal, i.e., GET#DESCRIPTOR, which is sent when the printer 10 is connected to the information processing terminal 20. In response, the control section 15 in the printer 10 outputs Descriptor including hierarchical data to the information processing terminal 20 through the USB cable. The Descriptor includes hierarchical data indicating that communications can be made in accordance with the network class and the second communication protocol.

The network class is for notifying the information processing terminal 20 that the printer 10 is capable of communicating in accordance with the Ethernet communication standard via the USB interface, for example, the printer 10 is capable of communicating in accordance with TCP/IP via the USB interface. The network class includes the Communication Device Class-Ethernet Networking Control Model (CDC-ECM) or the Remote Network Driver Interface Specification (RNDIS), for example.

Descriptor generated by the printer 10 includes information regarding Configuration, Interface Association, Interface, and Endpoint. In the example illustrated in FIG. 4, Configuration is set as "cfg=1". Interface in the printer class is set as "IF=0/ALT=0". Endpoint of the Interface in the printer class is set as "ENDP=1". Similarly, Interfaces in the network class are set as "IF=1/ALT=0", "IF=2/ALT=0", and "IF=2/ALT=1". Endpoint of Interface "IF=1/ALT=0" in the network class is set as "ENDP=2". Endpoint of Interface "IF=2/ALT=1" in the network class is set as "ENDP=3". Interface Association in the network class further includes information regarding Class, SubClass, and Protocol. In the example illustrated in FIG. 4, Class is set as "02h: Communication". SubClass is set as "06h: Ethernet Networking Control Model". Protocol is set as "00h: (unknown)".

The printer 10 sends, to the information processing terminal 20 through the USB cable, Descriptor indicating that the printer 10 is capable of communicating in accordance with the network class via "ENDP=3" of the USB interface, and is capable of communicating in accordance with the printer class via "ENDP=1" of the USB interface. The expression "capable of communicating in accordance with the network class via 'ENDP=3' of the USB interface" means that the printer 10 is capable of communicating in accordance with the Ethernet communication standard, for example, via "ENDP=3" of the USB interface, and implicitly means that the printer 10 is capable of communicating in accordance with TCP/IP via "ENDP=3" of the USB interface. Accordingly, the information processing terminal 20 is notified that the printer 10 is capable of communicating in accordance with the network class via "ENDP=3" of the USB interface, and is capable of communicating in accordance with the printer class via "ENDP=1" of the USB interface.

Figure 5:
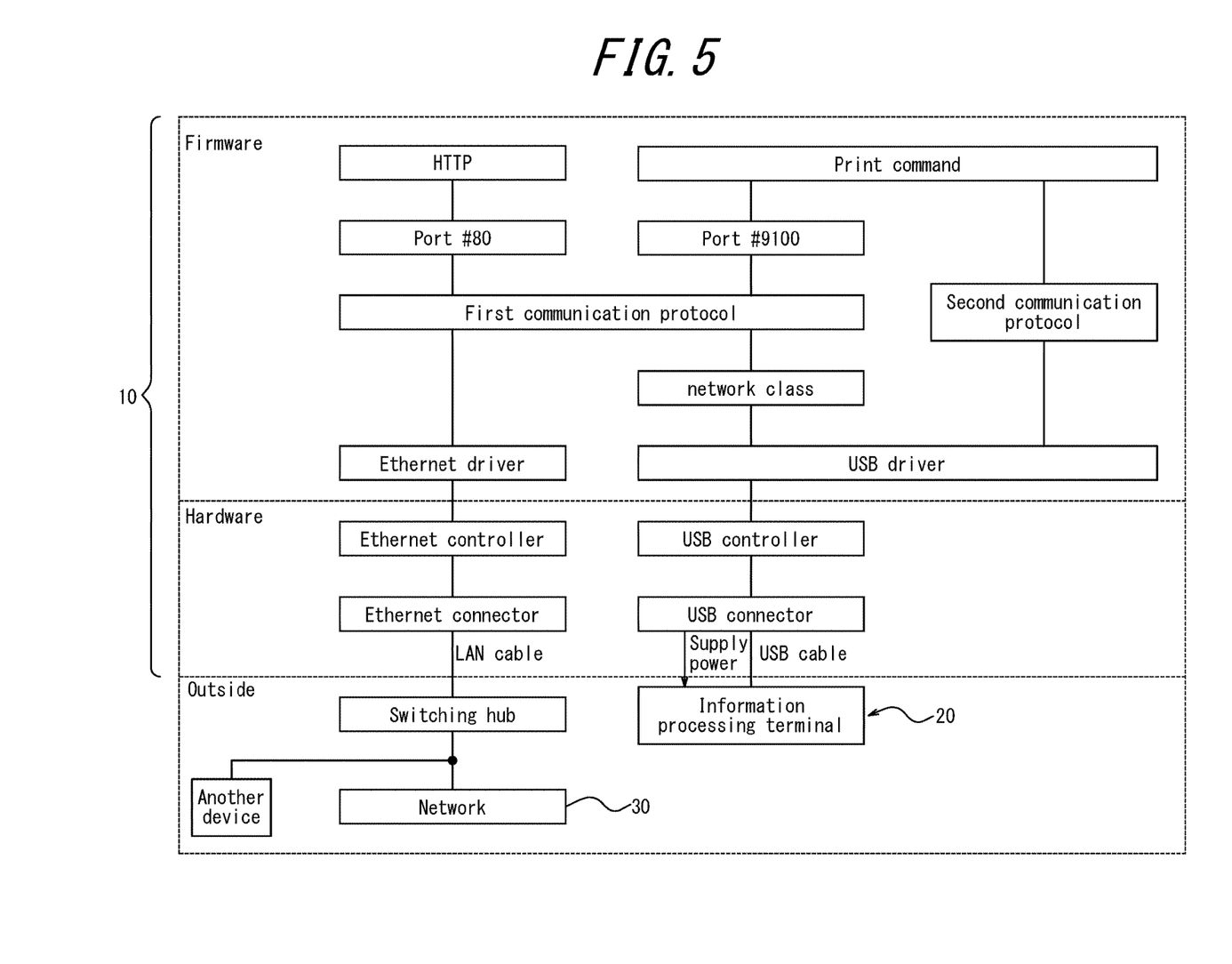
FIG. 5 is a functional block diagram including an example of a configuration of software processing in the control section in FIG. 2.

FIG. 5 is a functional block diagram including an example of a configuration of software processing in the control section 15 of FIG. 2. Referring to FIG. 5, a description will be given focusing on software processing carried out by the control section 15 in the printer 10.

As an example, it is assumed that the IP address of printer 10 is "192.168.0.1" (private IP address), the IP address of the information processing terminal 20 is "192.168.0.2" (private IP address), the IP address of the default gateway is "192.168.0.254" (private IP address), and the IP address of the server on the network 30 is "0.0.0.1" (global IP address).

When the control section 15 obtains data in accordance with the second communication protocol on the basis of a second frame, e.g., the printer class, from the information processing terminal 20 on the basis of the USB communication standard, the control section 15 extracts and interprets print information included in the data. In this case, the outline of the process flow related to the control section 15 is in the order of the information processing terminal 20, the USB cable, the USB connector, the USB controller, the USB driver, the second communication protocol, and the print command in FIG. 5.

As an example, the control section 26 in the information processing terminal 20 converts the print command into a data packet of the printer class and sends it to "ENDP=1" through the USB cable. The control section 15 in the printer 10 analyzes the data packet of the printer class received at "ENDP=1" through the USB cable, extracts and interprets the print command contained in that data packet, and carries out print processing according to the print command.

During a communication in accordance with the network class of the printer 10, the control section 26 in the information processing terminal 20 converts data into a TCP/IP packet. The control section 26 encapsulates the data which has been converted into the packet into a first frame on the basis of the Ethernet communication standard, and further encapsulates it into a second frame based on the USB communication standard. The control section 26 sends the data to the printer 10 through the USB cable to "ENDP=3" of the printer 10.

When the control section 15 obtains the data in accordance with the network class addressed to "ENDP=3" from the information processing terminal 20 through the USB cable, the control section 15 extracts the first frame on the basis of the Ethernet communication standard used for communications between the printer 10 and the network 30. More specifically, the control section 15 extracts the first frame on the basis of the Ethernet communication standard, from the second frame based on the USB communication standard used for communications between the printer 10 and the information processing terminal 20. In this case, the outline of the process flow related to the control section 15 is in the order of the information processing terminal 20, the USB cable, the USB connector, the USB controller, the USB driver, and the network class in FIG. 5.

The control section 15 extracts the TCP/IP packet from the first frame on the basis of the Ethernet communication standard, and analyzes it. When the control section 15 determines that the destination information included in the first frame obtained from the information processing terminal 20 specifies the printer, the control section 15 extracts and interprets the print information included in the first frame. In this case, the outline of the process flow related to the control section 15 is in the order of the information processing terminal 20, the USB cable, the USB connector, the USB controller, the USB driver, the network class, the first communication protocol, the port #9100, and the print command in FIG. 5.

As an example, the control section 26 in the information processing terminal 20 sends a print command to the IP address "192.168.0.1" of the printer 10. In this case, the control section 26 converts the print command into a TCP/IP packet, then encapsulates it into a first frame, further encapsulates it into a second frame, and sends it to the printer 10 through the USB cable to "ENDP=3". The control section 15 in the printer 10 analyzes the TCP/IP packet in the first frame extracted from the data which is addressed to "ENDP=3" and is received through the USB cable, and determines that the destination information, e.g., the IP address, included in the first frame specifies the printer 10. When the control section 15 determines that the IP address specifies the printer 10, the control section 15 extracts and interprets the print command included in the first frame and carries out print processing according to the print command.

When the control section 15 determines that the destination information included in the first frame obtained from the information processing terminal 20 does not specify the printer, the control section 15 forwards the first frame to the network 30. The information contained in the first frame includes, for example, inventory information at a store and customer payment information for a service provided by the store. In this case, the outline of the process flow related to the control section 15 is in the order of the information processing terminal 20, the USB cable, the USB connector, the USB controller, the USB driver, network class, the first communication protocol, the Ethernet driver, the Ethernet controller, the Ethernet connector, the LAN cable, the switching hub, and the network 30 in FIG. 5.

As an example, the control section 26 in the information processing terminal 20 sends information to the server on the network 30 to the IP address "0.0.0.1". In this case, the control section 26 converts the information into a TCP/IP packet, then encapsulates it into a first frame, and further encapsulates it into a second frame, and sends it to the printer 10 through the USB cable to "ENDP=3". The control section 15 in the printer 10 analyzes the TCP/IP packet in the first frame extracted from the data received at "ENDP=3" through the USB cable, and determines that the destination information, e.g., the IP address, included in the first frame does specify the printer 10. When the control section 15 determines that the IP address does not specify the printer 10, the control section 15 forwards the first frame to the network 30. More specifically, the control section 15 forwards the first frame to the IP address "192.168.0.254" of the default gateway through the LAN cable. The default gateway receives the first frame on the basis of the Ethernet communication standard through the LAN cable, and sends it via the network 30 to the server with the IP address "0.0.0.1" on the network 30.

When the control section 15 determines that the destination information included in the first frame obtained from the information processing terminal 20 specifies the printer 10, the control section 15 identifies the port number included in the first frame. In the case where the first frame is sent to the port number 9100, the control section 15 extracts the print command included in the print information and carries out print processing, for example. In the case where the first frame is sent to the port number 80, the control section 15 extracts setting information of the IP address, etc., and carries out certain setting processing including IP address setting processing, for example.

For example, when the information processing terminal 20 is connected to the USB connector of the printer 10 through a USB cable, the printer 10 supplies electric power to the information processing terminal 20. For example, when the printer 10 and the information processing terminal 20 are connected through a USB cable, the control section 15 in the printer 10 may supply electric power to the information processing terminal 20 by the power supply section 13. For example, the control section 15 may supply electric power to the information processing terminal 20 by the power supply section 13 at certain timing after the printer 10 and the information processing terminal 20 are connected through the USB cable.

For example, the control section 15 in the printer 10 may continuously supply electric power to the information processing terminal 20 while the printer 10 and the information processing terminal 20 are connected through the USB cable. In this case, the control section 15 in the printer 10 may control the electric power supplied to the information processing terminal 20 by the power supply section 13 on the basis of an initiation and a termination of a communication in accordance with the first communication protocol. The control section 15 may control at least one of the current and the voltage supplied to the information processing terminal 20 by the power supply section 13.

For example, when a communication in accordance with the first communication protocol is initiated, the control section 15 reduces electric power supplied to the information processing terminal 20 by the power supply section 13. For example, the control section 15 controls such that electric power of 18 W (=9 V×2 A) is supplied at the initial stage after the information processing terminal 20 is connected to the USB connector of the printer 10 through the USB cable, and the electric power is reduced to 5 W (=5 V×1 A) after a communication in accordance with the first communication protocol is initiated. The control section 15 may reduce the electric power simultaneously when a communication in accordance with the first communication protocol is initiated, or may reduce the electric power after predetermined time duration elapses after a communication in accordance with the first communication protocol is initiated.

For example, when a communication in accordance with the first communication protocol on the basis of the first frame is terminated, the control section 15 restores the electric power supplied to the information processing terminal 20 by the power supply section 13 back to the previous power level. The control section 15 restores the electric power which has been reduced upon an initiation of a communication in accordance with the first communication protocol, back to the previous power level before the initiation of the communication in accordance with the first communication protocol. The control section 15 may restore electric power back to the previous power level simultaneously when the communication in accordance with the first communication protocol is terminated, or may restore the electric power back to the previous power level after predetermined time duration elapses after the communication in accordance with the first communication protocol is terminated. For example, when a communication in accordance with the first communication protocol is terminated, the control section 15 may control such that the electric power which have been reduced to 5 W (=5 V×1 A) is restored to 18 W (=9 V×2 A) after 3 seconds elapses after the termination.

The control on power supply by the control section 15 is not limited to the method described above. For example, in some printer models, the power load on the printer 10 due to printing is smaller than the power load due to an increase in communications related to the first frame. In such a case, when the control section 15 determines that the destination information included in the first frame does not specify the printer 10 and a communication in accordance with the first communication protocol is initiated, the control section 15 may reduce the electric power supplied to the information processing terminal 20 by the power supply section 13. Otherwise, when the control section 15 determines that the destination information included in the first frame specifies the printer 10, the control section 15 may maintain the electric power supplied to the information processing terminal 20 by the power supply section 13.

On the contrary, in other printer models, the power load on the printer 10 due to printing is greater than the power load due to an increase in communications related to the first frame. In such a case, when the control section 15 determines that the destination information included in the first frame specifies the printer 10 and a communication in accordance with the first communication protocol is initiated, the control section 15 may reduce the electric power supplied to the information processing terminal 20 by the power supply section 13. Otherwise, when the control section 15 determines that the destination information included in the first frame does not specify the printer 10, the control section 15 may maintain the electric power supplied to the information processing terminal 20 by the power supply section 13.

The control section 15 may control the electric power supplied to the information processing terminal 20 by the power supply section 13 on the basis of the data volume in a communication in accordance with the first communication protocol.

For example, when the data volume in a communication in accordance with the first communication protocol becomes equal to or greater than a threshold value, the control section 15 reduces the electric power supplied to the information processing terminal 20 by the power supply section 13. The control section 15 may reduce the electric power simultaneously when the data volume in a communication in accordance with the first communication protocol becomes equal to or greater than the threshold value, or may reduce the electric power after predetermined time duration elapses after the data volume in a communication in accordance with the first communication protocol becomes equal to or greater than the threshold value. The threshold value may be determined by the user or the like as appropriate. For example, when the data volume in a communication in accordance with the first communication protocol becomes equal to or greater than 2 MB per second on average for 5 seconds, the control section 15 may reduce the power supply from 18 W (=9 V×2 A), to 5 W (=5 V×1 A) after 3 seconds elapses.

For example, when the data volume in a communication in accordance with the first communication protocol becomes smaller than the threshold value after the data volume in the communication in accordance with the first communication protocol became larger than the threshold value, the control section 15 restores the electric power supplied to the information processing terminal 20 by the power supply section 13 back to the previous power level. The control section 15 restores the electric power which has been reduced when the data volume in the communication in accordance with the first communication protocol became greater than the threshold, back to the previous power level. The control section 15 may restore the electric power back to the previous power level simultaneously when the data volume in a communication in accordance with the first communication protocol becomes smaller than the threshold value, or may restore the electric power back to the previous power level after predetermined time duration elapses after the data volume in a communication in accordance with the first communication protocol becomes smaller than the threshold value. For example, when the data volume in a communication in accordance with the first communication protocol falls below 2 MB per second on average for 5 seconds, the control section 15 may increase the electric power which has been reduced to 5 W (=5 V×1 A), to the maximum power supply amount of 18 W (=9 V×2 A) after 3 seconds elapses.

The control on power supply by the control section 15 is not limited to the method described above. For example, in some printer models, the power load on the printer 10 due to printing is smaller than the power load due to an increase in communications related to the first frame. In such a case, when the control section 15 determines that the destination information included in the first frame does not specify the printer 10 and the data volume in a communication in accordance with the first communication protocol becomes equal to or greater than a threshold value, the control section 15 may reduce the electric power supplied to the information processing terminal 20 by the power supply section 13. Otherwise, when the control section 15 determines that the destination information included in the first frame specifies the printer 10, the control section 15 may maintain the electric power supplied to the information processing terminal 20 by the power supply section 13.

On the contrary, in other printer models, the power load on the printer 10 due to printing is greater than the power load due to an increase in communications related to the first frame. In such a case, when the control section 15 determines that the destination information included in the first frame specifies the printer 10 and the data volume in a communication in accordance with the first communication protocol becomes equal to or greater than a threshold value, the control section 15 may reduce the electric power supplied to the information processing terminal 20 by the power supply section 13. Otherwise, when the control section 15 determines that the destination information included in the first frame does not specify the printer 10, the control section 15 may maintain the electric power supplied to the information processing terminal 20 by the power supply section 13.

The control section 15 may carry out only one of the power supply control on the basis of an initiation and a termination of a communication and the power supply control on the basis of the data volume in a communication, or may carry out both in parallel.

Figure 6:
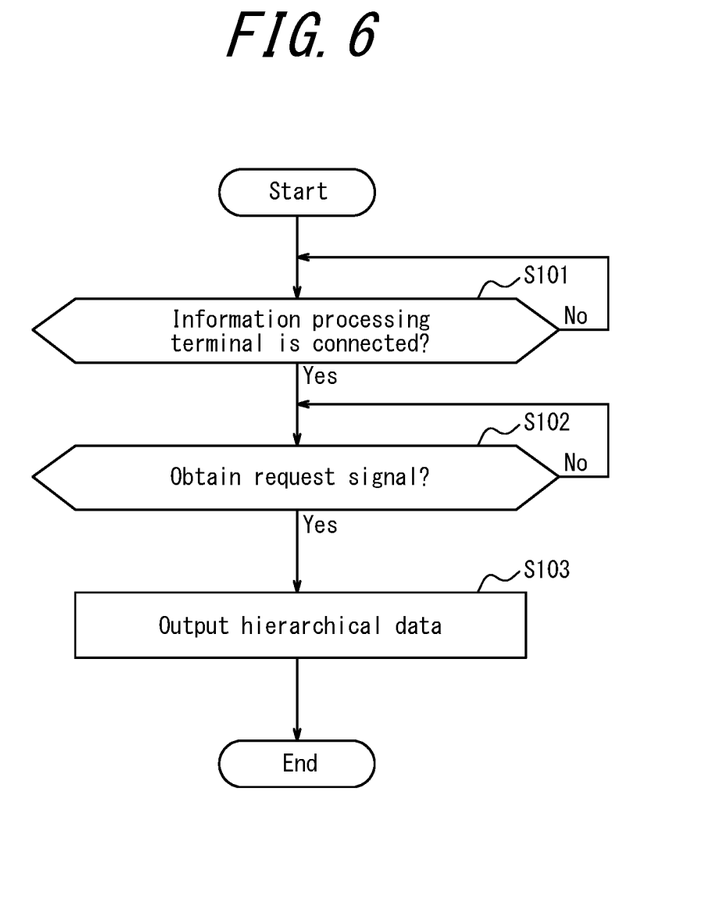
FIG. 6 is a flowchart for illustrating a first example of an information processing method carried out by the printer in FIG. 1.
Figure 7:
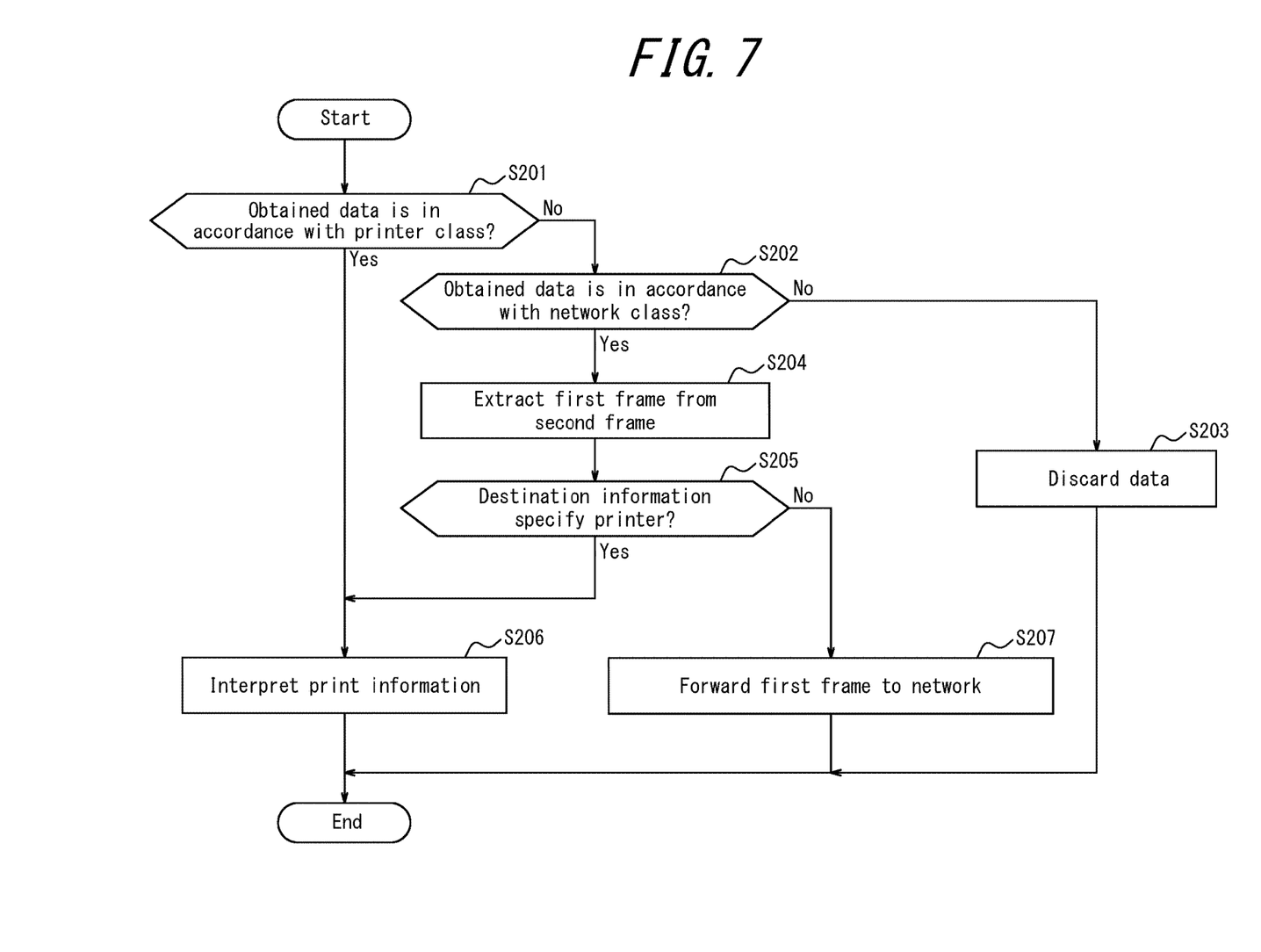
FIG. 7 is a flowchart for illustrating a second example of an information processing method carried out by the printer in FIG. 1.
Figure 8:
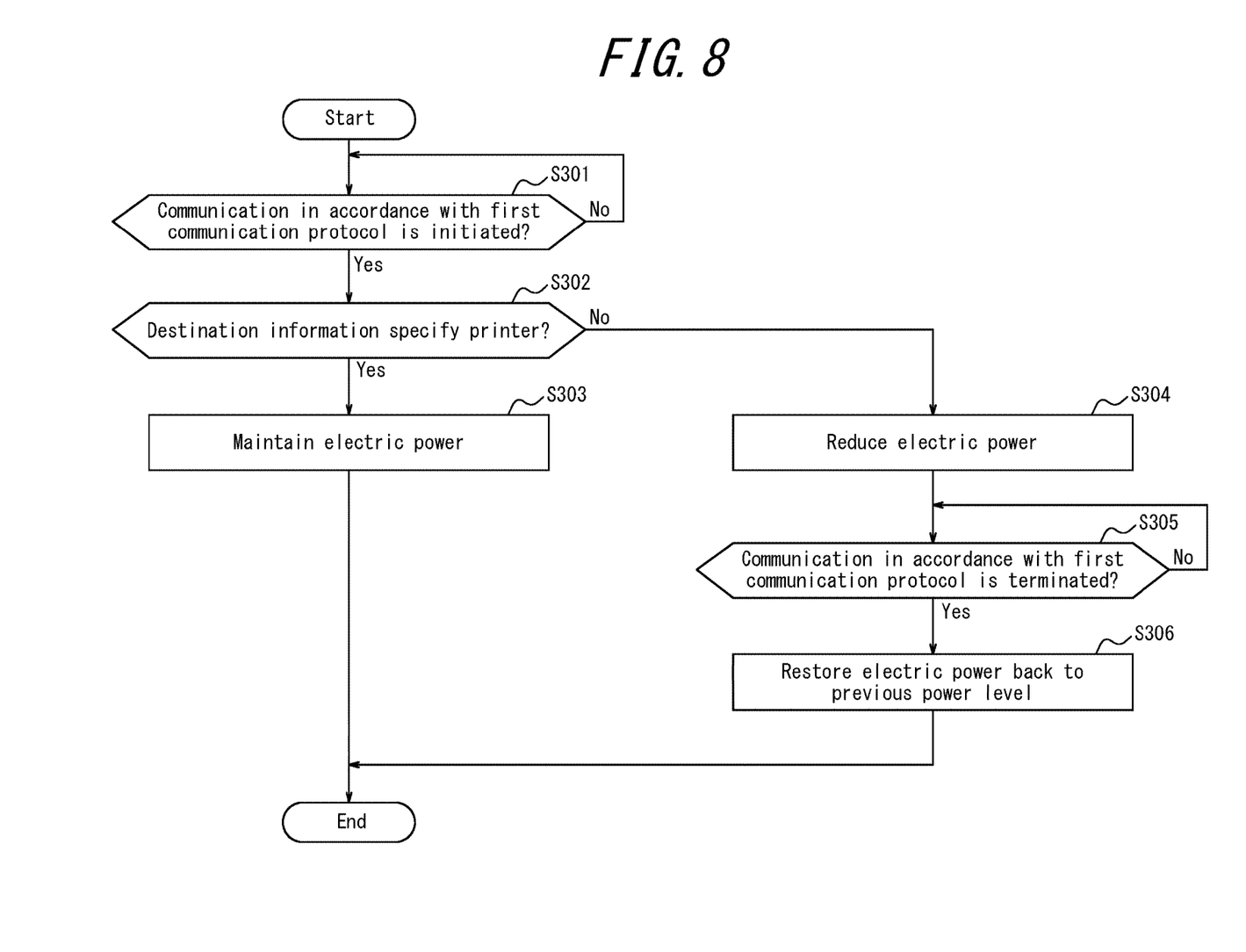
FIG. 8 is a flowchart for illustrating a third example of an information processing method carried out by the printer in FIG. 1.

Referring to FIGS. 6 to 8, an information processing method carried out by the control section 15 in the printer 10 according to one embodiment will be described. FIG. 6 is a flowchart for illustrating a first example of an information processing method carried out by the printer 10 in FIG. 1.

In Step S101, the control section 15 determines whether or not the printer 10 and the information processing terminal 20 are connected. If the control section 15 determines that the printer 10 and the information processing terminal 20 are connected, the control section 15 carries out the processing of the Step S102. If the control section 15 determines that the printer 10 and the information processing terminal 20 are not connected, the control section 15 carries out the processing of the Step S101 once again.

If the control section 15 determines in Step S101 that the printer 10 and the information processing terminal 20 are connected, the control section 15 determines in Step S102 whether or not a request signal is obtained from the information processing terminal 20. If the control section 15 determines that a request signal is obtained from the information processing terminal 20, the control section 15 carries out the processing of the Step S103. If the control section 15 determines that the request signal is not obtained from the information processing terminal 20, the control section 15 carries out the processing of the Step S102 once again.

If the control section 15 determines in Step S102 that a request signal is obtained from the information processing terminal 20, the control section 15 outputs, to the information processing terminal 20, hierarchical data indicating that communications can be made in accordance with the network class and the second communication protocol, in Step S103.

FIG. 7 is a flowchart for illustrating a second example of an information processing method carried out by the printer 10 in FIG. 1.

In Step S201, the control section 15 determines whether or not data obtained from the information processing terminal 20 on the basis of the second communication standard is in accordance with the printer class. If the control section 15 determines that the data is in accordance with the printer class, the control section 15 carries out the processing of the Step S206. If the control section 15 determines that the data is not in accordance with the printer class, the control section 15 carries out the processing of the Step S202.

If the control section 15 determines in Step S201 that the data obtained from the information processing terminal 20 on the basis of the second communication standard is not in accordance with the printer class, the control section 15 determines in Step S202 whether or not the data obtained from the information processing terminal 20 on the basis of the second communication standard is in accordance with the network class. If the control section 15 determines that the data is in accordance with the network class, the control section 15 carries out the processing of the Step S204. If the control section 15 determines that the data is not in accordance with the network class, the control section 15 carries out the processing of Step S203.

If the control section 15 determines in Step S202 that the data is not in accordance with the network class, the control section 15 discards the data in Step S203.

If the control section 15 determines in Step S202 that the data is in accordance with the network class, the control section 15 extracts a first frame based on the first communication standard used for communications between the printer 10 and the network 30, from a second frame based on the second communication standard used for communications between the printer 10 and the information processing terminal 20, in Step S204.

In Step S205, the control section 15 determines whether or not the destination information included in the data obtained from the information processing terminal 20 specifies the printer 10. If the control section 15 determines that the destination information specifies the printer 10, the control section 15 carries out the processing of the Step S206. If the control section 15 determines that the destination information does not specify the printer 10, the control section 15 carries out the processing of the Step S207.

If the control section 15 determines in Step S201 that the data is in accordance with the printer class or if the control section 15 determines in Step S205 that the destination information specifies printer 10, the control section 15 extracts and interprets the print information included in the data obtained from the information processing terminal 20, in Step S206.

If the control section 15 determines in Step S205 that the destination information does not specify the printer 10, the control section 15 extracts the first frame included in the data obtained from the information processing terminal 20 and forwards it to the network 30, in Step S207.

FIG. 8 is a flowchart for illustrating a third example of an information processing method carried out by the printer 10 in FIG. 1.

In Step S301, the control section 15 determines whether or not a communication in accordance with the first communication protocol is initiated. If the control section 15 determines that a communication in accordance with the first communication protocol is initiated, the control section 15 carries out the processing of Step S302. If the control section 15 determines that a communication in accordance with the first communication protocol is not initiated, the control section 15 carries out the processing of Step S301 once again.

If the control section 15 determines in Step S301 that a communication in accordance with the first communication protocol is initiated, the control section 15 determines in Step S302 whether or not the destination information included in a first frame specifies the printer 10. If the control section 15 determines that the destination information specifies the printer 10, the control section 15 carries out the processing of the Step S303. If the control section 15 determines that the destination information does not specify the printer 10, the control section 15 carries out the processing of the Step S304.

If the control section 15 determines in Step S302 that the destination information specifies the printer 10, the control section 15 maintains the electric power supplied to the information processing terminal 20 by the power supply section 13, in Step S303.

If the control section 15 determines in Step S302 that the destination information does not specify the printer 10, the control section 15 reduces the electric power supplied to the information processing terminal 20 by the power supply section 13, in Step S304.

In Step S305, the control section 15 determines whether or not the communication in accordance with the first communication protocol is terminated. If the control section 15 determines that the communication in accordance with the first communication protocol is terminated, the control section 15 carries out the processing of the Step S306. If the control section 15 determines that the communication in accordance with the first communication protocol is not terminated, the control section 15 carries out the processing of Step S305 once again.

If the control section 15 determines in Step S305 that the communication in accordance with the first communication protocol is terminated, the control section 15 restores the electric power supplied to the information processing terminal 20 by the power supply section 13 back to the previous power level in Step S306.

According to the printer 10 according to one embodiment as described above, the user' convenience is improved. For example, if the printer 10 determines that the destination information included in the first frame does not specify the printer 10, the printer 10 forwards the first frame to the network 30. This enables the information processing terminal 20 to communicate on the network 30 via the printer 10 while information processing terminal 20 and the printer 10 are connected. Otherwise, if the printer 10 determines that the destination information included in the first frame specifies the printer 10, the printer 10 extracts and interprets print information included in the first frame. This enables the printer 10 to carry out printing processing on the basis of the first communication standard.

As an example, the printer 10 is capable of carrying out printing processing on the basis of TCP/IP, so that the present disclosure is applicable to conventional systems in which print information is sent to a printer by means of a TCP/IP communication via an external device such as a router. As an example, the present disclosure can be applicable by simply modifying firmware without modifying hardware of a conventional printer.

The control section 15 extracts a first frame based on the first communication standard from a second frame based on the second communication standard, so that the printer 10 can communicate in accordance with the Ethernet communication standard via a USB interface, for example.

When the printer 10 obtains data in accordance with the second communication protocol on the basis of the second frame, from the information processing terminal 20 on the basis of the second communication standard, the printer 10 extracts and interprets the print information included in the data. This enables the printer 10 to carry out printing processing on the basis of the second communication standard.

As an example, the printer 10 is capable of carrying out print processing on the basis of the printer class, so that the present disclosure can be easily applicable to conventional systems in which an information processing terminal sends print information directly to a printer through a USB cable.

As an example, the present disclosure is applicable by simply modifying firmware without modifying hardware of a conventional printer.

The control section 15 outputs, to the information processing terminal 20, hierarchical data indicating that communications can be made in accordance with the network class and the second communication protocol, so that the information processing terminal 20 is notified of a connection to the printer 10 which is a composite device on the basis of both the network class and the printer class.

Because the printer 10 is capable of communicating on the basis of both the first communication standard and the second communication standard, the printer 10 can send and receive greater variety of information than conventional printers which communicate on the basis of only one of the two standards, for example. This enables the control section 15 to carry out the above-described power supply control to prevent or reduce an increase in the power consumption by the printer 10 when the communication load increases in the printer 10. This reduces a possible temperature increase of the board due to an increase in the power consumption by the printer 10 and thus prevents possible degradation of circuit components. Similarly, this also reduces the possibility of the electric power adapter exceeding the rating, resulting in shut-down of the printer 10.

As an example, when the printer 10 and the information processing terminal 20 are connected, the control section 15 supplies electric power to the information processing terminal 20 by the power supply section 13, so that a user can charge the information processing terminal 20 from the printer 10.

As an example, the control section 15 reduces the electric power when a communication in accordance with the first communication protocol is initiated. This can reduce the power consumption by the printer 10 regardless of the data volume in the communication in accordance with the first communication protocol.

As an example, when the communication in accordance with the first communication protocol is terminated, the control section 15 restores the electric power back to the previous power level. This increases the efficiency of the power supply to the information processing terminal 20.

As an example, when the control section 15 determines that the destination information included in the first frame does not specify the printer 10 and a communication according to first communication protocol is initiated, the control section 15 reduces the electric power, so that the control on power supply is carried out only during a communication to the network 30. This further increases the efficiency of power supply to the information processing terminal 20.

The printer 10 is connected to the information processing terminal 20 through a USB cable, and is connected to the network 30 through a LAN cable. Accordingly, a transmission of print information from the information processing terminal 20 to the printer 10, the control on power supply from the printer 10 to the information processing terminal 20, and accesses from the information processing terminal 20 to the network 30 are all carried out wiredly. In contrast to wireless communications, this helps to achieve stable communications even in a surrounding environment where a wide variety of radio waves are present as noises.

As illustrated in FIG. 1, wiring in the system 1 is simplified, and no additional component for connecting the printer 10 to the information processing terminal 20, such as conversion adapter, is not required. This reduces the user' costs.

Although the present disclosure has been described with reference to the drawings and examples, it is to be noted that a person skilled in the art can make a wide variety of variations and modifications on the basis of the present disclosure. Accordingly, it is noted that such variations and modifications are included within the scope of the present disclosure. For example, the functions included in each element, step, or the like may be rearranged as long as they are logically consistent. Or, multiple elements, or steps, or the like may be combined into one, or an element, or step, or the liked may be divided.

For example, the present disclosure may also be embodied as a program describing contents of the processing to embody each of the above-described functions of the system 1 or a storage medium recording such a program. It is to be understood that the scope of the present disclosure also encompasses these.

For example, in the case where the second communication standard used for communications between the printer 10 and the information processing terminal 20 is the same as the first communication standard, the control section 15 in the printer 10 may not carry out the processing of Step S204 in FIG. 7.

As an example, it has been described that, when a request signal from to the information processing terminal 20 is received when the printer 10 and the information processing terminal 20 is connected, the control section 15 in the printer 10 outputs, to the information processing terminal 20, hierarchical data indicating that communications can be made in accordance with the network class and the second communication protocol. This is, however, not limitative. The control section 15 may output any data to the information processing terminal 20.

REFERENCE SIGNS LIST

1 System
10 Printer
11 Communication section
12 Storage section
13 Power supply section
14 Print section
15 Control section
20 Information processing terminal
21 Communication section
22 Storage section
23 Input section
24 Output section
25 Power receiving section
26 Control section
30 Network

The invention claimed is:

1. A printer connectable to a network and an information processing terminal, the printer comprising
a control section configured to:
when obtaining data in accordance with a network class from the information processing terminal, extract a first frame based on a first communication standard used for communications between the printer and the network, from the data;
when determining that destination information included in the first frame specifies the printer, extract and interpret print information included in the first frame; and
when determining that the destination information included in the first frame does not specify the printer, forward the first frame to the network.

2. The printer according to claim 1, wherein
the control section extracts the first frame from a second frame based on a second communication standard used for communications between the printer and the information processing terminal.

3. The printer according to claim 1, wherein
when obtaining data in accordance with a second communication protocol on the basis of a second frame from the information processing terminal on the basis of a second communication standard used for communications between the printer and the information processing terminal, the control section extracts and interprets the print information contained in the data.

4. The printer according to claim 1, wherein
when obtaining a request signal from the information processing terminal when the printer and the information processing terminal are connected, the control section outputs, to the information processing terminal, hierarchical data indicating that communications can be made in accordance with the network class and a second communication protocol.

5. The printer according to claim 1, further comprising
a power supply section for supplying electric power to the information processing terminal,
wherein, when the printer and the information processing terminal are connected, the control section supplies the electric power to the information processing terminal by the power supply section.

6. The printer according to claim 5, wherein
when a communication in accordance with a first communication protocol on the basis of the first frame is initiated, the control section reduces the electric power supplied to the information processing terminal by the power supply section.

7. The printer according to claim 6, wherein
when the communication in accordance with the first communication protocol is terminated, the control section restores the electric power supplied to the information processing terminal by the power supply section back to a previous power level.

8. The printer according to claim 6,
when the control section determines that the destination information does not specify the printer and the communication in accordance with the first communication protocol is initiated, the control section reduces the electric power.

9. The printer according to claim 2, wherein
when obtaining data in accordance with a second communication protocol on the basis of the second frame from the information processing terminal on the basis of the second communication standard used for communications between the printer and the information processing terminal, the control section extracts and interprets the print information contained in the data.

10. The printer according to claim 9, wherein
when obtaining a request signal from the information processing terminal when the printer and the information processing terminal are connected, the control section outputs, to the information processing terminal, hierarchical data indicating that communications can be made in accordance with the network class and the second communication protocol.

11. The printer according to claim 10, further comprising
a power supply section for supplying electric power to the information processing terminal,
wherein, when the printer and the information processing terminal are connected, the control section supplies the electric power to the information processing terminal by the power supply section.

12. The printer according to claim 11, wherein
when a communication in accordance with a first communication protocol on the basis of the first frame is initiated, the control section reduces the electric power supplied to the information processing terminal by the power supply section.

13. The printer according to claim 12, wherein
when the communication in accordance with the first communication protocol is terminated, the control section restores the electric power supplied to the information processing terminal by the power supply section back to a previous power level.

14. The printer according to claim 13,
when the control section determines that the destination information does not specify the printer and the communication in accordance with the first communication protocol is initiated, the control section reduces the electric power.

15. The printer according to claim 3, wherein
when obtaining a request signal from the information processing terminal when the printer and the information processing terminal are connected, the control section outputs, to the information processing terminal, hierarchical data indicating that communications can be made in accordance with the network class and the second communication protocol.

16. The printer according to claim 15, further comprising
a power supply section for supplying electric power to the information processing terminal,
wherein, when the printer and the information processing terminal are connected, the control section supplies the electric power to the information processing terminal by the power supply section.

17. The printer according to claim 9, wherein
when obtaining a request signal from the information processing terminal when the printer and the information processing terminal are connected, the control section outputs, to the information processing terminal, hierarchical data indicating that communications can be made in accordance with the network class and the second communication protocol.

18. The printer according to claim 17, further comprising
a power supply section for supplying electric power to the information processing terminal,
wherein, when the printer and the information processing terminal are connected, the control section supplies the electric power to the information processing terminal by the power supply section.

19. The printer according to claim 18,
when the control section determines that the destination information does not specify the printer and the communication in accordance with the first communication protocol is initiated, the control section reduces the electric power.

20. The printer according to claim 12,
when the control section determines that the destination information does not specify the printer and the communication in accordance with the first communication protocol is initiated, the control section reduces the electric power.

* * * * *